3,470,030
METHOD OF MANUFACTURING A POROUS ELECTRODE CONTAINING A BORON COMPOUND

Ingemar Lindholm and Gun Karlsson, Vasteras, Sweden, assignors to Allmanna Svenska Elektriska Aktiebolaget, Vasteras, Sweden, a corporation of Sweden
No Drawing. Filed June 15, 1966, Ser. No. 557,624
Claims priority, application Sweden, June 21, 1965, 8,135/65
Int. Cl. H01m 13/00
U.S. Cl. 136—120                                11 Claims

ABSTRACT OF THE DISCLOSURE

A porous electrode material is produced by mixing a boron-containing material from the group of a metal borate, a partially hydrolyzed metal borate, a metal borate at least partially reduced by means of treatment with hydrogen, a boron oxide and an at least partially hydrolyzed boron oxide with an electrically conductive carrier material for said boron-containing material, compressing the mixture and sintering to form a coherent product.

---

Electrical energy may be generated by means of reaction between a continually supplied combustible substance such as, for example, hydrogen and a continually supplied oxidizing substance, such as for example oxygen, air or halogen in a so-called fuel cell, which in its simplest form may consist of a suitable fluid electrolyte and two porous electrodes immersed in this, one of which is arranged between the electrolyte and the combustible substance and the other between the electrolyte and the oxidizing substance.

The electrode reactions in the fuel cell occur in the contact areas between electrolyte, combustible and oxidizing substances respectively and electrode. These contact areas are situated at the areas in the electrodes where electrolyte and combustible and oxidizing substances respectively are adjacent to each other. The places of the electrodes which are active during the reaction are therefore situated in the pore surfaces.

A porous electrode in a fuel cell need not form a separating wall between a gas chamber containing a gaseous substance, such as a fuel, and an electrolyte chamber containing a fluid electrolyte. The combustible substance may also be dispersed or dissolved in the electrolyte, as is the case with cells for fluid fuel and then the electrolyte occurs with its fuel on both sides of the electrode as well as in its pores. Certain oxidants, such as hydrogen peroxide, may also be dissolved in the electrolyte used and then the conditions for the electrode on the oxidant side are analogous with those described for the electrode on the fuel side in fuel cells with fluid fuel.

In fuel cells it is known to use electrodes, which in the main are built up of nickel or other metal, for example cobalt, iron or silver, and in which the areas nearest the pore walls contain nickel or another metal, respectively, in activated form. In the parts of the electrodes situated outside the mentioned areas nickel or another metal used is present in inactive form and its task is to act as carrier material for the active areas situated nearest the pore walls.

Fuel cell electrodes are also known which contain nickel boride as active material in the pores. Such electrodes have, among other things, the important advantage over other known electrodes that they have a considerably greater mechanical strength and that they are not pyrophoric when stored in air.

According to the present invention it has now been found possible by using a boron compound to produce in a much simpler way a porous electrode material which has the advantages of the nickel boride electrodes. The boron compound which is used according to the invention can be washed and dried considerably quicker than earlier used boron compounds, and furthermore the manufacture of the electrode material is facilitated since it may be carried out entirely without the use of inflammable products. Also the basic materials which can be used according to the invention are considerably cheaper than those used earlier.

The present invention thus relates to a method of producing a porous electrode material, preferably for use in fuel cells, by arranging a boron compound at least in the pores of the electrode material which in addition contains an electrically conductive material acting as carrier material for the boron compound. The invention is characterised in that as boron compound is used a metal borate, a partially hydrolyzed metal borate, a metal borate at least partially reduced by means of treatment with hydrogen, and possibly also partially hydrolyzed, a boron oxide or an at least partially hydrolyzed boron oxide and that chemical groups containing boron, possibly at least partially are dissolved out of the electrode material containing the carrier material.

To achieve the full effect of the boron compound it may be necessary to subject it to a heat treatment when it has been arranged in contact with the carrier material.

As examples of suitable borates may be mentioned borates of the metals iron, nickel, cobalt, chromium, manganese, silver, tungsten, molybdenum and alkali borates such as sodium and potassium borate. The borates may be of different types such as tetraborates, orthoborates, metaborates and perborates. By hydrolyzed products of boroxide is meant boric acids such as ortho-, meta- and tetraboric acid.

The carrier material may, for example, consist of one of the substances iron, nickel, cobalt, carbon, titanium, tungsten, molybdenum and silver or alloys of two or more of these substances. If a boron oxide or a hydrolyzed product of a boron oxide is used as boron compound, the carrier material consists of one of the metals just mentioned or alloys of them. Particularly with the use of nickel chromium borate, cobalt chromium borate or silver borate, partially hydrolyzed products of these substances or products of these substances at least partially reduced by means of treatment with hydrogen, as boron compound and nickel or cobalt as carrier material, electrodes are obtained with particularly advantageous properties. The two first mentioned substances give high current density when used in fuel electrodes, for example hydrogen or hydrazine electrodes, and the last mentioned high current density when used in oxidization electrodes, for example, oxygen electrodes.

According to an advantageous embodimetn of the invention the porous electrode material is produced by sintering a mixture of particles of the carrier material and particles of the boron compound to a coherent product in a vacuum or in inert atmosphere. By inert atmosphere is meant atmosphere which does not destroy the boron compound.

The quantities of the boron compound and carrier material used in the manufacture of the electrode material, may with advantage be 0.5–50 percent and 50–99.5 percent respectively of the weight of the electrode material.

When manufacturing a sintered electrode material according to the invention the particle size in the particle material may be varied within wide limits dependent on the fuel used, for example hydrogen, methanol, and the electrode type. The size of the pores in a manufactured electrode is determined to a great extent by the size of the particles used. In most cases it is desirable that all the pores are the same size, which is attained by the use of well demarcated powder fractions. In many cases it is suitable to use powder fractions with an average particle size of 0.001–50μ for the boron compounds and powder fractions with an average particle size of 1–100μ for the carrier material. With the use of nickel chromium borate or cobalt chromium borate as active material and nickel or cobalt as inactive carrier material it has been found especially advantageous to use powder fractions with an average particle size of about 1μ or less for the borate and of 3–20μ for the carrier material. In order to increase the porosity of the electrode there may be added to the mixture of particles up to about 25 percent by weight of an expanding agent, such as ammonium carbonate or ammonium bicarbonate, having the capacity to dissociate in gaseous products during the sintering process.

The sintering of the powder mixture to an electrode material can in many cases take place with advantage at a temperature of about 300–1200° C. depending on the type of boron compound and carrier material. Particularly with the use of nickel and cobalt as carrier material a sintering temperature of 300–800° C. is suitable, and with the use of silver as carrier material, 300–700° C.

According to another suitable embodiment of the invention the porous electrode material is produced by impregnating the electrode material with a solution containing the boron compound or with one or several successive solutions which form the boron compound in the pores of the electrode material. The borate is subjected to heat treatment when it has been arranged in the pores. It may possibly also be reduced, for example by treating it with hydrogen. An example of such a solution is a water solution of sodium borate. If the boron compound is applied by impregnating an already formed electrode material, it is suitable to use solutions which give a percentage of the boron compound in the electrode constituting 0.1–20 percent of the weight of the electrode material. The size of the pores in an electrode material preformed in this way is usually 1–50μ.

If a porous electrode material manufactured according to the invention is placed in an alkaline liquid, the chemical groups containing boron are gradually at least partially dissolved out of the electrode material. Such a dissolution can occur in acid or neutral liquids. It has been found that after such a dissolution the electrode material is at least as active as before the dissolution. Such a dissolution is obtained automatically if an electrode material with a boron compound of the type mentioned at the pore surfaces is used in a fuel cell with an alkaline liquid, for example potassium hydrate, as electrolyte, or in another device with alkaline electrolyte where electrode reactions are used to generate electric energy. Of course, if desired, the mentioned dissolution may be performed before the electrode material is arranged in the fuel cell or the mentioned device.

The invention will be described in more detail in the following with reference to the description of a number of embodiments.

Example 1

Nickel borate is produced by means of reaction between a solution of 30 g. $NiCl_2 \cdot 6H_2O$ in 100 ml. distilled water and a solution of 15 g. $Na_2B_4O_7$ dissolved in 100 ml. distilled water, the latter solution being poured into the first. The precipitate formed is filtered and washed with distilled water and dried at 100° C. in air.

10 parts by weight of this nickel borate with an average particle size of about 1μ is mixed with 90 parts by weight carbonyl nickel powder with an average particle size of about 5μ. The nickel borate contains only particles within the range 0–5μ and the carbonyl nickel powder 40 percent by weight particles having particle sizes within the range 5–10μ and 60 percent by weight particles with particle sizes within the range 0–5μ. The mixture is compressed to electrodes with a diameter of 35.6 mm. and thickness of 1.7 mm. with a pressure of 1500 kiloponds/centimetre$^2$. The electrodes are sintered in nitrogen for 30 minutes at 540° C.

The electrodes can be used, for example, as hydrogen electrodes in fuel cells with alkaline electrolyte.

Example 2

Chromium borate is produced by means of reaction between a solution of 30 g. $CrCl_3 \cdot 6H_2O$ in 100 ml. distilled water and a solution of 15 g. $Na_2B_4O_7$ dissolved in 100 ml. distilled water, the latter solution being poured into the former. The precipitate formed is filtered and washed with distilled water, after which it is dried in air at 100° C.

5 parts by weight of this chromium borate with an average particle size of about 1μ are mixed with 95 parts by weight carbonyl nickel powder with an average particle size of about 5μ. The chromium borate contains only particles within the range 0–5μ and the carbonyl nickel powder 40 percent by weight particles with particle sizes within the range 5–10μ and 60 percent by weight particles with particle sizes within the range 0–5μ. The mixture is compressed to electrodes with a diameter of 35.6 mm. and a thickness of 1.7 mm. with a pressure of 2000 kiloponds/centimetre$^2$. The electrodes are sintered under vacuum for 30 minutes at a temperature of 600° C.

The electrodes can be used, for example, as hydrogen electrodes in fuel cells.

Example 3

A borate containing both nickel and chromium is produced by reaction between a solution of 30 g. $NiCl_2 \cdot 6H_2O$ and 4 g. $CrCl_3 \cdot 6H_2O$ in 100 ml. distilled water and a solution of 15 g. $Na_2B_4O_7$ dissolved in 100 ml. distilled water, the latter solution being poured into the first. The precipitate formed is filtered and washed with distilled water and dried at 100° C. in air.

10 parts by weight of this nickel chromium borate with an average particle size of about 1μ is mixed with 90 parts by weight carbonyl nickel powder with an average particle size of about 5μ. The nickel chromium borate contains only particles within the range 0–5μ and the carbonyl nickel powder 40 percent by weight particles having particle sizes within the range 5–10μ and 60 percent by weight particles with particle sizes within the range 0–5μ. The mixture is compressed to electrodes with a diameter of 35.6 and a thickness of 1.7 mm. with a pressure of 1500 kiloponds/centimetre$^2$. The electrodes are sintered in nitrogen for 30 minutes at a temperature of 540° C.

The electrodes can be used, for example, as hydrogen electrodes in fuel cells.

Example 4

Cobalt borate is produced by a reaction between a solution of 20 g. $CoSO_4$ in 100 ml. distilled water and a solution of 15 g. $K_3B_3O_6$ in 100 ml. distilled water, the latter solution being poured into the first. The precipitate formed is filtered and washed in distilled water, after which it is dried in air at 100° C.

10 parts by weight of this cobalt borate with an average particle size of about 1μ is mixed with 90 parts by weight cobalt powder with an average particle size of about 5μ. The cobalt borate contains only particles within the range 0–5μ and the carbonyl nickel powder 40 percent by weight particles with particle sizes within the range 5–10μ and 60 percent by weight particles with particle sizes within the range 0–5μ. The mixture is compressed to electrodes with a diameter of 35.6 mm. and a thickness of 1.7 mm. with a pressure on 2000 kiloponds/centimetre$^2$. The electrodes are sintered in nitrogen for 30 minutes at a temperature of 550° C.

The electrodes can be used, for example, in fuel cells having alkaline electrolyte as fuel electrodes for, for example, hydrogen or hydrazine.

Example 5

Nickel borate is produced by reaction between 2 parts by weight $NiSO_4$ and 5 parts by weight $Na_2B_4O_7 \cdot 10H_2O$. The starting materials are mixed in a platinum crucible and heated in air for 2 hours to 800° C. The reaction product is crushed and ground in a ball mill to a fine powder.

25 parts by weight of this nickel borate with an average particle size of about $20\mu$ is mixed with 75 parts by weight nickel powder having an average particle size of about $20\mu$. The nickel borate, like the nickel powder, contains up to 50 percent by weight particles with particle sizes within the range $20-30\mu$, the 40 percent by weight particles with particle sizes within the range $10-20\mu$ and 10 percent by weight particles with particle sizes under $10\mu$. The mixture is compressed to electrodes with a diameter of 35.6 mm. and a thickness of 1.7 mm. with a pressure of 1000 kiloponds/centimetre$^2$. The electrodes are sintered in nitrogen at 800° C.

The electrodes can be used, for example, as hydrogen electrodes in fuel cells.

Example 6

Iron borate is produced by reaction between a solution of 30 g. $FeCl_2 \cdot 4H_2O$ in 100 ml. distilled water with the addition of 5 ml. 1 M HCl and a solution of 15 g. $Na_2B_4O_7$ dissolved in 100 ml. distilled water, the latter solution being poured into the first. The precipitate formed is filtered and washed in distilled water, after it is dried in nitrogen at 100° C.

10 parts by weight of this iron borate having an average particle size of about $2\mu$ is mixed with 90 parts by weight nickel powder having an average particle size of about $10\mu$. The iron borate contains only particles with particle sizes within the range $0-5\mu$ and the nickel powder 60 percent by weight particles with particle sizes within the range $10-20\mu$ and 40 percent by weight particles with particle sizes below $10\mu$. The mixture is compressed to electrodes with a diameter of 35.6 mm. and a thickness of 1.7 mm. with a pressure of 3000 kiloponds/centimetre$^2$. The electrodes are sintered for 60 minutes in nitrogen at 700° C.

The electrodes can be used, for example, as hydrogen electrodes in fuel cells.

Example 7

Silver borate is produced by reaction between a solution of 20 g. $AgNO_3$ in 100 ml. distilled water and a solution of 15 g. $Na_2B_4O_7$ in 100 ml. distilled water, the latter solution being poured into the first. The precipitate formed is filtered and washed in distilled water and dried under vacuum at 100° C.

5 parts by weight of this silver borate having an average particle size of about $1\mu$ (all particles below $5\mu$) is mixed with 95 parts by weight carbonyl nickel powder having an average particle size of about $5\mu$ of the type mentioned in Example 1. The mixture is compressed to electrodes with a diameter of 35.6 mm. and a thickness of 1.7 mm. with a pressure of 1500 kiloponds/centimetre$^2$. The electrodes are sintered for 30 minutes in nitrogen at 500° C.

The electrodes can be used as, for example, hydrogen electrodes or oxygen electrodes in fuel cells.

Example 8

2 parts by weight nickel borate produced according to Example 1 is mixed with 98 parts by weight carbonyl iron powder having an average particle size of $10\mu$ and with the same particle size distribution as the nickel powder in Example 6. The mixture is compressed to electrodes with a diameter of 35.6 mm. and thickness of 1.7 mm. with a pressure of 3000 kiloponds/centimetre$^2$. The electrodes are sintered in nitrogen for 30 minutes at 700° C.

The electrodes can be used, for example, as hydrogen electrodes in fuel cells.

Example 9

20 parts by weight cobalt borate is produced according to Example 4 and mixed with 80 parts by weight molybdenum powder having an average particle size of about $20\mu$ and the same particle size distribution as the nickel powder in Example 5. The mixture is compressed to electrodes with a diameter of 35.6 mm. and a thickness of 1.7 mm. with a pressure of 2000 kiloponds/centimetre$^2$. The electrodes are sintered under vacuum for 4 hours at 1000° C.

The electrodes can be used as fuel electrodes for, for example, hydrogen, methanol and propane in fuel cells with alkaline or acid electrolyte.

Example 10

10 parts by weight nickel borate produced according to Example 1 is mixed with 90 parts by weight tungsten powder having an average particle size of about $20\mu$ and with the same particle size distribution as the nickel powder in Example 5. The mixture is compressed to electrodes with a diameter of 35.6 mm. and a thickness of 1.7 mm. with a pressure of 1500 kiloponds/centimetre$^2$. The electrodes are sintered under vacuum for 4 hours at a temperature of 1200° C.

The electrodes can be used as fuel electrodes for, for example, hydrogen or methanol.

Example 11

20 parts by weight nickel borate produced according to Example 1 is mixed with 80 parts by weight silver powder having an average particle size of about $5\mu$ and with the same particle size distribution as the nickel powder in Example 1. The mixture is compressed to electrodes with a pressure of 1000 kiloponds/centimetre$^2$ with a diameter of 35.6 mm. and a thickness of 1.7 mm. The electrodes are sintered for 30 minutes in nitrogen at 400° C.

The electrodes are, for example, usable as hydrogen or oxygen electrodes in fuel cells.

Example 12

10 parts by weight nickel borate produced according to Example 1 is mixed with 90 parts by weight chromium powder having an average particle size of about $20\mu$ and with the same particle size distribution as the nickel powder in Example 5. The mixture is compressed to electrodes with a diameter of 35.6 mm. and a thickness of 1.7 mm. with a pressure of 200 kiloponds/centimetre$^2$. The electrodes are sintered for 30 minutes under vacuum at 800° C.

The electrodes can be used as hydrogen electrodes in fuel cells.

Example 13

10 parts by weight $B_2O_3$ having an average particle size of about $5\mu$ and with the same particle size distribution as the nickel powder in Example 1 is mixed with 90 parts by weight carbonyl nickel powder having an average particle size of about $5\mu$ and with the same particle size distribution as the nickel powder in Example 1. The mixture is compressed to electrodes with a diameter of 35.6 mm. and a thickness of 1.7 mm. with a pressure of 1500 kiloponds/centimetre$^2$. The electrodes are sintered for 30 minutes in nitrogen at 500° C.

They can be used as hydrogen electrodes.

Example 14

10 parts by weight nickel borate produced according to Example 1 is mixed with 90 parts by weight titanium powder having an average particle size of about $40\mu$. The titanium powder contains 60 percent by weight particles with particle sizes within the range $40-60\mu$ and 40 percent by weight particles with particle sizes within the range 30–40μ. The mixture is compressed to electrodes with a diameter of 35.6 mm. and a thickness of 1.7 mm. with a pressure of 1000 kiloponds/centimetre². The electrodes are sintered under vacuum at 700° C. for 30 minutes.

The electrodes can be used as hydrogen electrodes.

Example 15

Porous nickel electrodes are produced by mixing 90 parts by weight carbonyl nickel powder with an average particle size of about 5μ and with the same particle size distribution as the nickel powder in Example 1 and 10 parts by weight ammonium bicarbonate powder having an average particle size of about 10μ and with the same particle size distribution as the nickel powder in Example 6. The mixture is compressed to electrodes with a pressure of 1000 kiloponds/centimetre². The electrodes are sintered for 30 minutes in hydrogen atmosphere at 800° C.

The electrodes are impregnated under vacuum with a solution of 30 g. $NiCl_2.6H_2O$ and 4 g. $CrCl_3.6H_2O$ in 100 ml. distilled water for ten minutes. The electrodes are taken out and dried in air at 80° C. After this the electrodes are impregnated under vacuum in a solution of 15 g. $Na_2B_4O_7$ in 100 ml. distilled water. The electrodes are dried in air at 100° C. and heat treated under vacuum or in hydrogen for 30 minutes at 400° C. If hydrogen is used a reduction product is formed by the nickel borate formed in the pores.

The electrodes can be used as fuel electrodes for, for example, hydrogen.

Example 16

10 parts by weight nickel borate produced according to Example 1 is mixed with 80 parts by weight carbonyl nickel powder having an average particle size of about 5μ and with the same particle size distribution as the nickel powder in Example 1 and 10 parts by weight polytetrafluorethylene dispersion. The mixture is dried under vacuum at 90° C. The dried mixture is compressed with a pressure of 1000 kiloponds/centimetre² on a nickel net with the mesh size 100 mesh for 5 minutes to electrodes having a diameter of 35.6 mm. and a thickness of 3 mm. and sintered in nitrogen atmosphere at 350° C. for 30 minutes.

The electrodes can be used as hydrogen electrodes. They are hydrophobic and can be used with low gas pressure as, for example, 5 cm. water columns.

Example 17

Nickel borate is produced by reaction between a solution of 30 g. $NiCl_2.6H_2O$ in 100 distilled water and a solution of 30 g. $Na_2B_4O_7$ dissolved in 100 ml. distilled water. The precipitated borate is washed with distilled water and dried. 3 parts by weight of this nickel borate having an average particle size of about 2μ (all particles below 5μ) is mixed with 97 parts by weight carbonyl nickel powder having an average particle size of about 5μ and with the same particle distribution as the nickel powder in Example 1. The mixture is compressed to electrodes with a diameter of 36 mm. and thickness of 1.5 mm. with a pressure of 2000 kiloponds/centimetre² and sintered for 30 minutes in nitrogen at 540° C.

The electrodes can be used as fuel electrodes for, for example, hydrogen.

Example 18

Nickel borate produced by reaction between a solution of 30 g. $NiCl_2.6H_2O$ in 100 ml. distilled water and a solution of 8 g. $Na_2B_4O_7$ in 100 ml. distilled water. The precipitated borate is washed with distilled water and treated with 1000 cm.³ water at 100° C. for one hour. Through this treatment with water at 100° C. the nickel borate is partially hydrolyzed since some of the borate groups are replaced by hydroxyl groups. After this the partially hydrolyzed borate is washed with distilled water and dried. 5 parts by weight of this nickel borate having an average particle size of about 2μ (all particles below 5μ) are mixed with 95 parts by weight nickel powder having an average particle size of about 10μ and with the same particle size distribution as the nickel powder in Example 6. The mixture is compressed to electrodes with a diameter of 36 mm. and thickness of 1.5 mm. with a pressure of 2000 kiloponds/centimetre² and sintered for 30 minutes under vacuum at 700° C.

The electrodes can be used as fuel electrodes for, for example, hydrogen.

Example 19

The same porous nickel electrode, the production of which is described in Example 15, is impregnated instead of with $NiCl_2.6H_2O$ and $CrCl_3.6H_2O$ followed by an impregnation with $Na_2B_4O_7$, with only a solution of $Na_2B_4O_7$, the concentration of which is 15 g. borate in 100 ml. distilled water. The electrodes are dried and heat treated under vacuum or in hydrogen for 30 minutes at 500° C.

Example 20

Nickel borate produced according to Example 1 is treated in hydrogen for 30 minutes at 500° C. 10 parts by weight of this powder are mixed with 90 parts by weight carbonyl nickel powder of the type described in Example 1, after which the mixture is compressed and sintered in the manner indicated in Example 1.

Example 21

An electrode material is produced in the manner described in Example 13, the only difference being that $Na_2B_4O_7$ is used as boron compound instead of $B_2O_3$.

If the electrode material is used in a fuel cell with a liquid electrolyte and with a gaseous substance as fuel or oxidant, it is usually provided on the side which is to face the electrolyte with a layer having fine pores. The purpose of this layer is, due to capillary forces, to prevent gas penetrating into the electrolyte chamber. Such a layer with fine pores can be applied on the electrode material produced in the manner described above, for example by arranging carbonyl nickel on the electrode material by means of a sedimentation process.

The described electrodes can be used in fuel cells having different electrolytes, such as, for example, potassium or sodium hydroxide solutions. The electrode material can not only be formed as plates, but also, for instance, as grains, or the like. Such electrode material in grain form is used, amongst other things, in fuel cells with liquid fuel, for example alcohol or hydrazine dissolved in the electrolyte, whereby for example it may be arranged in a container manufactured of a net or perforated sheet metal. The electrode material may also be used in fuel cells of the type where the electrolyte consists of an ion exchange membrane of organic or inorganic type.

The described electrodes may with advantage be used not only in fuel cells but also in other types of devices where electrode reactions, particularly with hydrogen and oxygen as participant parts are used for generating electrical energy, e.g. accumulators.

We claim:
1. Method of producing a porous electrode, in which process a boron compound is arranged at least in the pores of the electrode material which, in addition, contains an electrically conductive material acting as carrier material for the boron compound, comprising mixing a boron-containing material selected from the group consisting of a metal borate, a partially hydrolyzed metal borate, a metal borate at least partially reduced by means of treatment with hydrogen, a boron oxide and an at least partially hydrolyzed boron oxide with an electrically conductive carrier material for said boron-containing material, compressing the mixture and sintering under inert conditions to a coherent product with destroying the boron compound.

2. Method according to claim 1, characterized in that a mixture of particles of carrier material and particles of the boron compound are sintered to a coherent product under vacuum.

3. Method according to claim 1, characterized in that a mixture of particles of carrier material and particles of the boron compound are sintered to a coherent product in inert atmosphere.

4. Method according to claim 1, characterized in that the boron-containing material is a borate of one of the metals iron, nickel, cobalt, chromium, manganese, silver, tungsten or molybdenum.

5. Method according to claim 1, characterized in that the boron-containing material is a nickel chromium borate or a cobalt chromium borate.

6. Method according to claim 1, characterized in that the boron-containing material is a silver borate.

7. Method according to claim 1, characterized in that as carrier material is used one of the substances iron, nickel, cobalt, carbon, titanium, tungsten, molybdenum and silver and alloys of these substances.

8. Method according to claim 1 characterized in that the chemical groups containing boron are at least partially dissolved out of the electrode.

9. Method according to claim 1 in which said boron-containing material is a metal borate at least partially reduced by treatment with hydrogen and also partially hydrolyzed.

10. Method according to claim 1 in which said boron-containing material is a metal borate at least partially reduced by treatment with hydrogen and also partially hydrolyzed and the carrier material is one of the substances iron, nickel, cobalt, carbon, titanium, tungsten, molybdenum and silver and alloys of two or more of these substances.

11. Method according to claim 9 in which the chemical groups containing boron are at least partially dissolved out of the electrode.

References Cited

UNITED STATES PATENTS

| | | | |
|---|---|---|---|
| 1,648,679 | 11/1927 | Fonda | 252—518 XR |
| 1,958,740 | 5/1934 | Calkins et al. | 75—222 |
| 2,769,114 | 10/1956 | Williams | 252—512 XR |
| 3,166,833 | 2/1965 | Globus | 29—182.5 |
| 3,183,123 | 5/1965 | Haworth | 136—86 |
| 3,183,124 | 5/1965 | Jasinski | 136—86 XR |
| 3,202,862 | 8/1965 | Paley | 252—512 XR |
| 3,380,856 | 4/1968 | Pohl | 136—120 |

FOREIGN PATENTS 127,242  4/1959  U.S.S.R.

WINSTON A. DOUGLAS, Primary Examiner

A. SKAPARS, Assistant Examiner

U.S. Cl. X.R.

23—59; 29—182.1, 182.5; 75—202, 222; 252—432